(12) United States Patent
Alston et al.

(10) Patent No.: US 11,188,435 B2
(45) Date of Patent: Nov. 30, 2021

(54) HEALTH MONITORING FOR CLOUD COMPUTING PLATFORMS

(71) Applicant: Pivotal Software, Inc., San Francisco, CA (US)

(72) Inventors: Amber Lynn Alston, Lakewood, CO (US); Robert James Sullivan, Denver, CO (US); Kevin Gates, Berkeley, CA (US)

(73) Assignee: Pivotal Software, Inc., San Francisco, CA (US)

( * ) Notice: Subject to any disclaimer, the term of this patent is extended or adjusted under 35 U.S.C. 154(b) by 166 days.

(21) Appl. No.: 16/206,865

(22) Filed: Nov. 30, 2018

(65) Prior Publication Data

US 2019/0188107 A1    Jun. 20, 2019

Related U.S. Application Data

(60) Provisional application No. 62/608,544, filed on Dec. 20, 2017.

(51) Int. Cl.
  *G06F 9/46*    (2006.01)
  *G06F 11/34*   (2006.01)
  (Continued)

(52) U.S. Cl.
  CPC ........ *G06F 11/3409* (2013.01); *G06F 3/0482* (2013.01); *G06F 9/445* (2013.01);
  (Continued)

(58) Field of Classification Search
  None
  See application file for complete search history.

(56) References Cited

U.S. PATENT DOCUMENTS 8,997,078 B2   3/2015  Spivak et al.
9,071,522 B2   6/2015  Lucovsky et al.
(Continued)

OTHER PUBLICATIONS

"Rodenas ""Docker Service Broker for Cloud Foundry,"" posted at Aug. 2014, 13 pages".
(Continued)

*Primary Examiner* — Kenneth Tang
(74) *Attorney, Agent, or Firm* — Fish & Richardson P.C.

(57) ABSTRACT

Methods, systems, and apparatus, including computer programs encoded on computer storage media, for implementing a health monitoring system for a cloud application platform. One of the methods includes deploying, by a health monitoring application of a cloud application platform that provisions resources from an underlying cloud infrastructure system, probes for testing components of the cloud application platform. Each probe is configured to perform tests that measure performance of a component of the cloud application platform. A probe can attempt to provision resources from the underlying cloud infrastructure system by launching a test application on the cloud application platform and determine whether the test application launched successfully using resources from the underlying cloud infrastructure system. The health monitoring application receives results of the tests and provides, for display in a graphical user interface, a representation of a history of the results of the tests for at least one of the components.

20 Claims, 13 Drawing Sheets

(51) Int. Cl.
G06F 11/30 (2006.01)
G06F 9/48 (2006.01)
H04L 29/14 (2006.01)
H04L 29/08 (2006.01)
G06F 9/445 (2018.01)
G06F 9/455 (2018.01)
G06F 9/50 (2006.01)
H04L 12/24 (2006.01)
H04L 12/713 (2013.01)
H04L 12/931 (2013.01)
H04L 29/06 (2006.01)
G06F 9/451 (2018.01)
G06F 3/0482 (2013.01)

(52) U.S. Cl.
CPC .......... G06F 9/451 (2018.02); G06F 9/45558 (2013.01); G06F 9/4843 (2013.01); G06F 9/5072 (2013.01); G06F 9/5077 (2013.01); G06F 11/3006 (2013.01); H04L 41/0293 (2013.01); H04L 41/0806 (2013.01); H04L 41/0893 (2013.01); H04L 41/5051 (2013.01); H04L 45/586 (2013.01); H04L 49/70 (2013.01); H04L 63/0263 (2013.01); H04L 63/0853 (2013.01); H04L 63/102 (2013.01); H04L 63/20 (2013.01); H04L 67/10 (2013.01); H04L 67/16 (2013.01); H04L 67/34 (2013.01); H04L 69/40 (2013.01); G06F 2009/45583 (2013.01); G06F 2009/45587 (2013.01)

(56) References Cited

U.S. PATENT DOCUMENTS

| | | | |
|---|---|---|---|
| 9,274,758 | B1 | 3/2016 | Qin et al. |
| 9,998,339 | B1* | 6/2018 | Brajkovic ............ H04L 41/0853 |
| 2011/0265081 | A1 | 10/2011 | Lucovsky et al. |
| 2012/0072555 | A1 | 3/2012 | Deluca et al. |
| 2012/0266168 | A1* | 10/2012 | Spivak .................... H04L 47/70 718/1 |
| 2013/0019015 | A1* | 1/2013 | Devarakonda ........ G06F 9/5072 709/226 |
| 2013/0060933 | A1* | 3/2013 | Tung .................... H04L 41/5025 709/224 |
| 2014/0026122 | A1* | 1/2014 | Markande ........... G06F 11/3688 717/124 |
| 2015/0120939 | A1 | 4/2015 | Islam et al. |
| 2015/0222494 | A1* | 8/2015 | Broda ..................... H04L 41/22 715/736 |
| 2017/0063615 | A1* | 3/2017 | Yang ................... H04L 41/5054 |
| 2018/0048716 | A1 | 2/2018 | Madhayyan et al. |
| 2018/0285165 | A1 | 10/2018 | Helsey |
| 2018/0324203 | A1 | 11/2018 | Estes et al. |
| 2018/0329733 | A1* | 11/2018 | Aronov ................. G06F 9/5055 |
| 2019/0044800 | A1* | 2/2019 | Singh .................. H04L 41/0816 |
| 2019/0065277 | A1 | 2/2019 | Raikov et al. |
| 2019/0095320 | A1* | 3/2019 | Biswas ................. G06F 21/552 |
| 2019/0187865 | A1 | 6/2019 | Gresham et al. |

OTHER PUBLICATIONS

AppDynamics [online], "Application Performance Monitoring & Management," available on or before Oct. 16, 2018, via Internet Archive: Wayback Machine URL <https://web.archive.org/web/20181016153208/https://www.appdynamics.com/>, [retrieved on Nov. 14, 2018], retrieved from: URL <https://www.appdynamics.com/>, 4 pages.

DataDog [online], "Modem Monitoring & Analytics," available on or before Nov. 11, 2018, via Internet Archive: Wayback Machine URL <https://web.archive.org/web/20181111043724/https://www.datadoghq.com/> [retrieved on Nov. 14, 2018], retrieved from: URL <https://www.datadoghq.com/>, 3 pages.

New Relic [online], "Real-Time Insights for Modem Software," available on or before Nov. 1, 2018, via Internet Archive: Wayback Machine URL <https://web.archive.org/web/20181110010129/https://newrelic.com/>, [retrieved on Nov. 14, 2018], retrieved from: URL <https://newrelic.com/>, 6 pages.

Prometheus [online], "From Metrics to Insight," available on or before Dec. 19, 2017, via Internet Archive: Wayback Machine URL <https://web.archive.org/web/20171219031415/https://prometheus.io/>, [retrieved on Nov. 14, 2018], retrieved from: URL <https://prometheus.io/>, 5 pages.

* cited by examiner

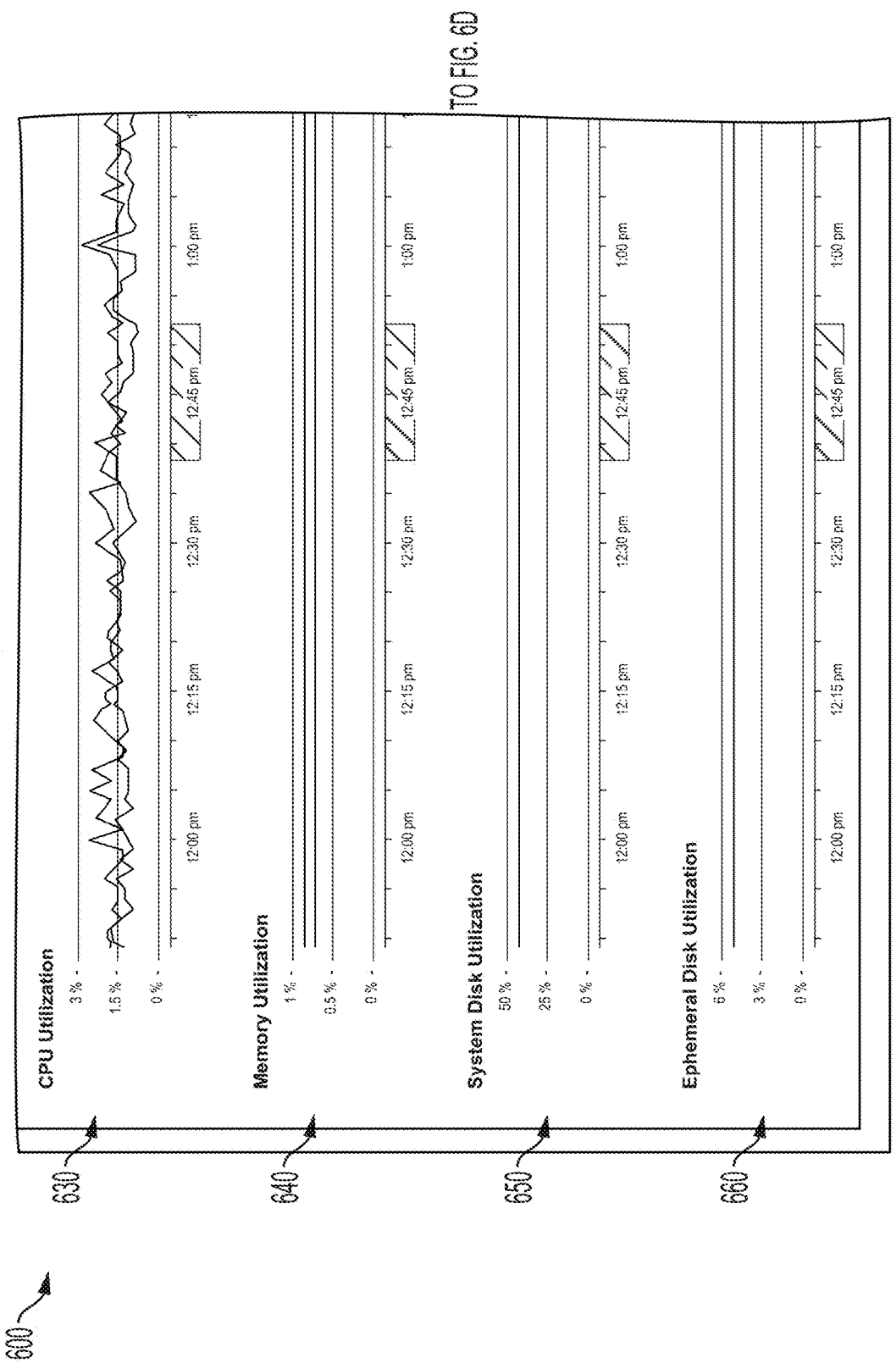

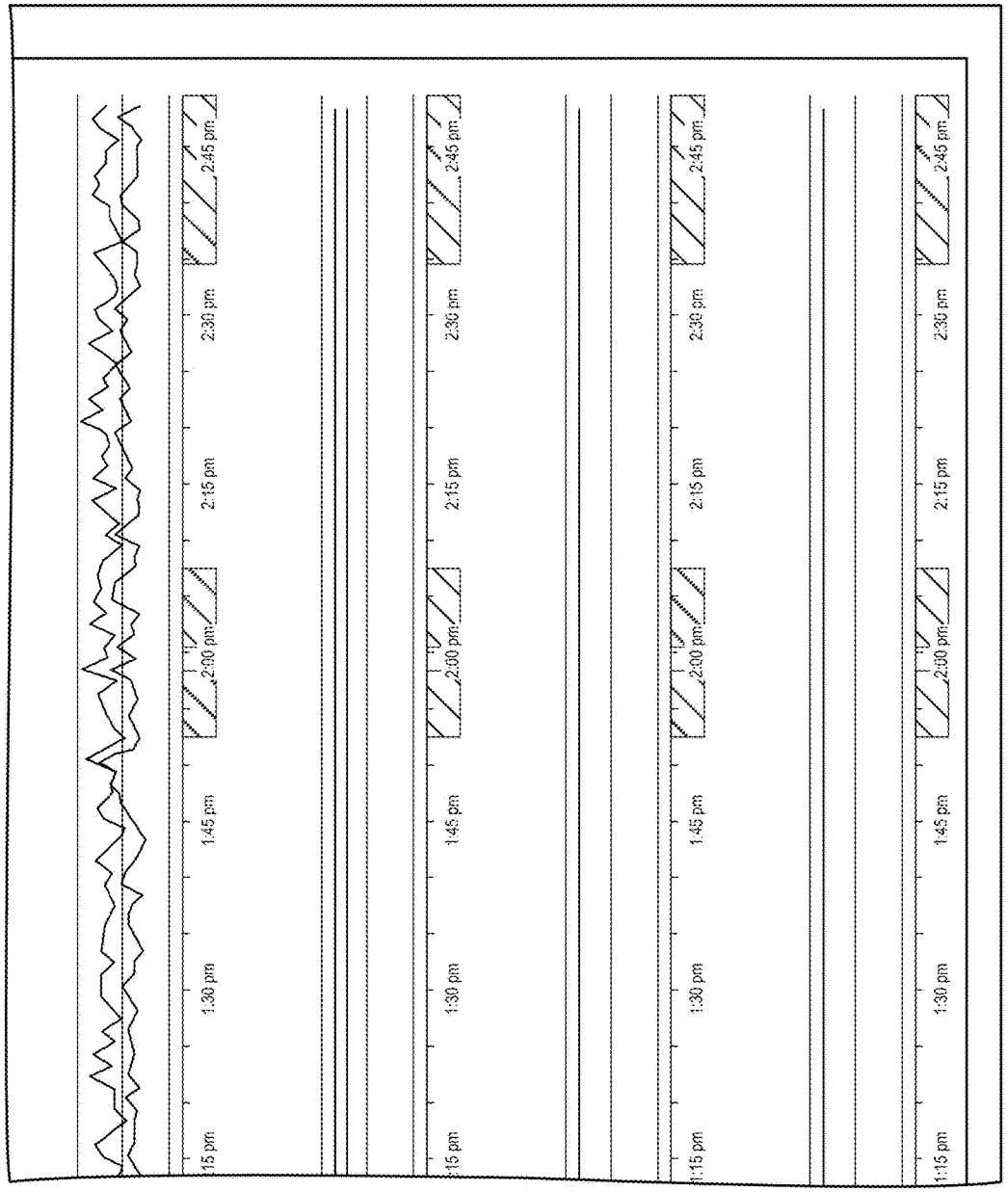

HEALTH MONITORING FOR CLOUD COMPUTING PLATFORMS

CROSS REFERENCE TO RELATED APPLICATIONS

This application claims the benefit under 35 U.S.C. § 119(e) of the filing date of U.S. Patent Application No. 62/608,544, filed Dec. 20, 2017, entitled "FRAMEWORK FOR MANAGING CLOUD COMPUTING PLATFORMS," the entire contents of which are hereby incorporated by reference.

BACKGROUND

This specification generally relates to cloud computing techniques.

In cloud computing, a set of shared computing resources, storage resources, and network resources can be provisioned to users, generally in the form of computing clusters including one or more virtual machines. Multiple physical computing appliances, e.g., computers in a server farm, can provide a service platform for provisioning these resources. The service platform is sometimes referred to as infrastructure as a service (IaaS). A deployment system can automate and simplify transforming a source code or binary code representation of an application into a service instance of that application using IaaS resources. The service instance can then be accessed by end users on a cloud computing platform. An example of a cloud application platform is a Pivotal Cloud Foundry® software product deployed on a set of cloud appliances. An example deployment system is a BOSH system that deploys and manages service instances on a cloud application platform.

SUMMARY

This specification describes methods, systems, and computer-readable media that implement a health monitoring system for a cloud application platform. The health monitoring system deploys multiple probes to test various components of the cloud application platform and/or the underlying cloud infrastructure from which resources are provisioned by the cloud application platform. A probe can include an application configured to perform a task and measure performance of a respective component in supporting or completing the task. Another probe can attempt to provision resources from the underlying cloud infrastructure system by launching a test application on top of the cloud application platform. Each probe can provide, to the health monitoring system, data specifying the result(s) of the test. The health monitoring system provides results of the tests in one or more graphical user interfaces.

Particular embodiments of the subject matter described in this specification can be implemented to realize one or more of the following advantages. By deploying probes that cause components of a cloud application platform to attempt to perform various tasks, the performance of the components in performing routine tasks can be monitored. Monitoring the performance of the components in performing such tasks can enable the health monitoring system predict problems with the cloud application platform and/or the underlying cloud infrastructure system prior to applications executing on the underlying cloud infrastructure system crashing or experiencing performance degradations.

Graphical user interfaces presented by the health monitoring system enables users to quickly and efficiently identify any components that have failed one or more tests and the times at which the tests were failed without having to navigate to multiple different interfaces to evaluate the health of the various components of the cloud application platform. For example, presenting a horizontal graph for each test that includes a color-coded bar that represents the result of each test enables the user to quickly identify which, if any, test has failed and when the test failed relative to when other tests failed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

FIGS. 6A-6D depict an example graphical user interface that presents metrics for jobs deployed on a cloud application platform.

Like reference numbers and designations in the various drawings indicate like elements.

DETAILED DESCRIPTION

Figure 1:
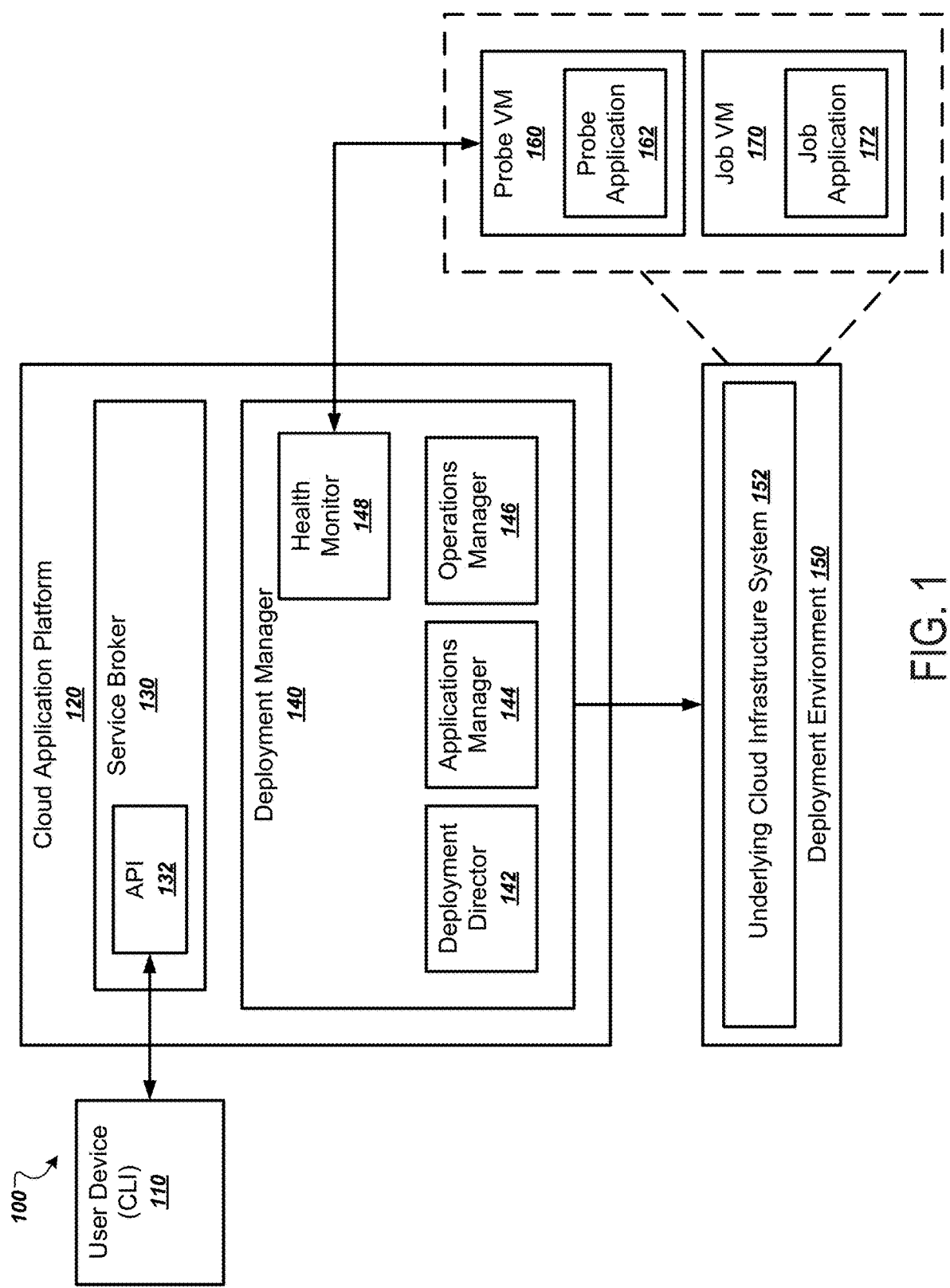
FIG. 1 is a block diagram illustrating an example environment in which a health monitor monitors the health of components of a cloud application platform.

FIG. 1 is a block diagram illustrating an example environment 100 in which a health monitor 148 monitors the health of components of a cloud application platform 120. In general, the cloud application platform 120 is a platform that enables users to develop, run, and manage applications using resources of an underlying cloud infrastructure system, e.g., an IaaS or a local on-premises computer network. The cloud application platform 120 runs applications, scales the application and resources required by the application, manage the health of the application and its resources, and performs other appropriate tasks related to managing the execution of applications. An example of a cloud application platform is a Pivotal Cloud Foundry® software product deployed on a set of cloud appliances.

The cloud application platform 120 includes a service broker 130 and a deployment manager 140. In some implementations, the service broker 130 is an on-demand service broker. An on-demand service broker can provision IaaS resources, and/or other resources at service instance creating time. In general, the service broker 130 allows application developers to provision services to be used by one or more service instances on the cloud application platform 120. The service broker 130 can be implemented as one or more computers configured as Hypertext Transfer Protocol (HTTP) servers that conform to a service broker application programming interface (API) 132. The API 132 allows applications to view and select resources of the cloud application platform 120. The API 132 also receives and processes commands related to applications received from a user device 110.

The user device 110 is an electronic device, e.g., a computer, that provides one or more interfaces to an application developer. The interface can be a command-line interface (CLI), graphical user interface (GUI), or a combination of the two. The user device 110 can use the CLI to issue a request to deploy a service instance of an application. A service instance is also referred to as a deployment of the application. For example, a user, e.g., an application developer, can enter a command and the name of the application and optionally other information, e.g., a path to a deployment manifest or a number of instances of the application to launch, in the CLI of the user device 110. An example command is "cf push application name" in which "cf push" is the command to deploy the application and "application name" is the name of the application. The user device 110 can then send data specifying the command and the name of the application to the service broker 130.

The CLI of the user device 110 can also be used to perform other tasks with respect to clusters managed by the cloud application platform 120. For example, the CLI can accept other commands that enable users to view information about applications, login to the cloud application platform 120, start and stop an application, delete an application, scale an application, e.g., increase or decrease a number of instances of the application, and/or perform other appropriate tasks related to applications. As described in more detail below, the user device 110 can also provide GUIs that present data related to the health and performance of components of the cloud application platform 120.

The service broker 130 can provide requests received via the API 132 to the deployment manager 140. For example, if the request is to deploy an application, the deployment manager 140 can deploy the application in a deployment environment 150. The deployment manager 140 can then manage the execution of the application in the deployment environment 150.

The deployment environment 150 can be a cloud computing platform and/or a local deployment platform, e.g., one or more on-premises physical servers. The deployment environment 150 includes an underlying cloud infrastructure system 152 that includes resources, e.g., processors, memory, etc., that can be provisioned for running applications. For example, the underlying cloud infrastructure system 152 can be an IaaS provided by a cloud computing provider.

Example underlying cloud infrastructure systems include VMWare Cloud Foundation, Google Cloud Platform (GCP) and Amazon Web Services (AWS) cloud. In some implementations, the deployment manager 140 is a BOSH-compliant tool implemented on one or more computers. BOSH provides a tool chain for packaging, deploying, and managing cloud software.

The deployment manager 140 includes a deployment director 142, an apps manager 144, an ops manager 146, and a health monitor 148. The deployment director, which can be a BOSH Director in implementations in which the deployment manager is a BOSH-compliant tool, controls the creation and deployment of virtual machines and applications that are executed in the virtual machines. When a request is received to deploy an application, the deployment director 142 can initiate one or more virtual machines and install the application in the one or more virtual machines. For example, the deployment director 142 can initiate the job virtual machine 170 and install the job application 172 in the job virtual machine 172.

The apps manager 144 is an interface, e.g., a CLI or GUI, that enables users to create and manage organizations, spaces, applications, services, users, and roles of users. An organization can be a development account that individuals or multiple collaborators can own and use. A space provides users with access to a shared location for application development, deployment, and maintenance. Users can have one or more roles that define the user's permissions in an organization and/or spaces within organizations.

The operations manager 146 provides APIs and GUIs to manage the deployment, configuration, and upgrade of components of the cloud application platform 120. For example, the operations manager 146 can provide interfaces that enable users to configure deployment director 142, the applications manager 144, the health monitor 148, and/or other components of the cloud application platform 120.

The health monitor 148 monitors the health and performance of the components of the cloud application platform 120, e.g., the deployment director 142, the applications manager 144, the operations manager 146, and the CLI of the cloud application platform 120. The health monitor 148 can also monitor the health and performance of the underlying cloud infrastructure system 152. The health monitor 148 can also generate GUIs that present data related to the health and performance of the components of the cloud application platform 120 and/or the underlying cloud infrastructure system 152. Some example GUIs are illustrated in FIGS. 3-6 and described below.

The health monitor 148 can test the components by deploying probes that perform tasks, e.g., a set of tests, that test the performance and/or responsiveness of the components. A probe can include an application that executes in the deployment environment 150. For example, the health monitor 147 can initiate a probe virtual machine 160 and deploy one or more probe applications 162 on the probe virtual machine 160. Each probe application 162 can perform one or more tasks to test the performance, responsiveness, and/or health of one or more components of the cloud application platform 120. In some implementations, each probe application 162 is deployed in its own virtual machine. In some implementations, multiple probe applications 162 are deployed in a same probe virtual machine.

Each probe application 162 can perform tasks that test the performance of a particular component of the cloud application platform 120. The tasks can be based on the component and the version of the component. For example, an older version of the deployment director 142 may not have the same capabilities as a newer version of the deployment director 142. In this example, the probe applications for the different versions can have different tasks that perform different tests that are suitable for the different versions of the deployment director 142. The health monitor 148 can identify the version of each component and deploy the appropriate probe application for the component(s) based on the version information.

An example probe application, which may also be referred to as a deployment director health application, can perform a set of tasks to test the ability of the deployment director 142 and/or the cloud application platform 120 to deploy an application and/or a virtual machine in the deployment environment 150. The deployment director health application can attempt to cause the deployment director 142 to deploy a test application and/or virtual machine in the deployment environment 150. For example, the deployment director health application can cause the deployment director 142 to deploy a virtual machine, start the virtual machine, stop the virtual machine, and delete the virtual machine. The deployment director health application can also monitor the duration of time taken by the deployment director 142 to perform each task. The deployment director health application can also cause the deployment director 142 to deploy an application in the virtual machine, start the application, stop the application, and delete the application. The deployment director health application can also monitor the duration of time taken by the deployment director 142 to perform each of these tasks.

The test application can be a generic application that is simply used to test the deployment director 142. For example, the test application may or may not be an application that a user requested to be deployed. Deploying the virtual machine and/or the test application can test the ability of the deployment director 142 and/or the deployment environment 150 to provision resources for hosting the virtual machine and/or the application. For example, in deploying the virtual machine or application, the deployment director 142 will attempt to provision resources of the underlying cloud infrastructure system 152 to host the virtual machine or application. If it fails to deploy the virtual machine or application, or takes longer than normal to deploy the virtual machine or application, the cloud application platform 120 and/or the underlying cloud infrastructure system 152 may be overloaded or failing.

The deployment director health application can compare the durations of time to respective thresholds. If one or more of the durations of time meets or exceeds its respective threshold, the deployment director health application can determine that the deployment director 142 failed this health test and provide, to the health monitor 148, data indicating that the deployment director 142 failed the health test. The deployment director health application can also provide, to the health monitor 148, data specifying each duration of time. For example, the health monitor 148 can present data specifying whether the deployment director passed or failed the health test and/or data specifying the durations of time in a GUI. The deployment director health application can perform the tests periodically based on a specified time period and provide the results to the health monitor 148 after each test.

Another example probe application, which may also be referred to as a CLI command health application, can perform a set of tasks to test the ability of the CLI of the cloud application platform 120 to receive and respond to requests. The CLI command health application can attempt to log into the CLI, push an application using the CLI, e.g., to deploy an application, start an application using the CLI, request and receive logs from the CLI, stop an application using the CLI, and/or delete an application using the CLI. The CLI command health application can perform these tasks by acting like an actual user device submitting the requests to the CLI. The CLI command health application and monitor the CLI to determine whether the tasks were performed successfully and determine a duration of time the CLI took to complete each task. For example, the CLI command health application can determine a push time that represents a duration of time taken to launch an application in response to receiving a push request from a CLI of a user device.

The CLI command health application can perform each of these tasks periodically based on a specified time period. After each performance, the CLI command health application can provide, to the health monitor 148, data specifying whether each task was performed successfully and the duration of time taken to perform each task. The CLI command health application can also determine an overall test result based on whether each task was performed successfully and optionally the duration of time taken to perform each task. In a particular example, the CLI command health application can determine that the overall test result is a pass if every task was performed successfully within a respective duration of time for the task. The CLI command health application can also determine a total duration of time taken to complete all of the tasks. The CLI command health application can also provide, to the health monitor 148, data specifying the overall test result and the total time.

The health monitor 148 can monitor performance metrics of the CLI and generate alerts in response to the performance metrics meeting or exceeding respective thresholds. For example, the health monitor 148 can monitor push times to determine whether the push times are increasing. If the push times increase at least a threshold amount from one test to the next or if at least a threshold number of sequential push times increase relative to the respective previous push times, the health monitor 148 can generate an alert. In another example, if at least a threshold number of sequential push tests fail, the health monitor 148 can generate an alert. The alerts can be audible alerts, visual alerts presented on a GUI, electronic messages, e.g., test messages or e-mails, or other appropriate types of alerts.

Another example probe application, which may also be referred to as a canary health application, can perform a set of tasks to test a canary application. In some implementations, the canary application is the applications manager 144. The health and performance of the applications manager 144 can provide insight into the performance of other applications, e.g., user applications, running on the cloud application platform 120. In some implementations, the canary application is a test application running on the cloud application platform 120. The canary health application can perform a task that determines whether the canary application is available, e.g., by requesting a response from the canary application and determining whether a response is received. The canary health application can also determine the duration of time taken for the canary application to respond.

The canary health application can perform the tasks periodically based on a specified time period. The canary health application can also provide, to the health monitor 148, data specifying whether the canary application passed the test, e.g., responded within a threshold duration of time, and/or the duration of time taken by the canary application to respond.

Another example probe application, which may also be referred to as an ops manager health application, can perform a set of tasks to test the performance of the operations manager 146. Issues with the operations manager 146 can impact an operator's ability to perform an upgrade to a component of the cloud application platform 120 and/or to scale components of the cloud application platform 120. The ops manager health application can perform a task to determine whether the operations manager 146 is available. The ops manager health application can perform this task periodically based on a specified time period. The ops manager health application can also provide, to the health monitor 148, data specifying whether the test was successful, e.g., whether the operations manager 146 was available, after each test.

The health monitor 148 can also determine various metrics related to the health and performance of the cloud application platform 120 and its components. The health monitor 148 can present the metrics in user interfaces, e.g., the user interfaces illustrated in FIGS. 3-6, and/or use the metrics to generate alerts. In some implementations, the deployment manager 142 can also use the metrics to determine when to scale components of the cloud application platform 120, e.g., automatically without user input.

The components of the cloud application platform 120 can output performance and usage operational metrics. In addition, the probes described above can provide additional performance and usage operation metrics. Awareness of the system usage and the underlying infrastructure architecture can also provide valuable insight in determining the ratios at which the components should be maintained. For example, some metrics can require an up to date awareness of the changing architecture in order to provide the most accurate and meaningful component scaling indications. The health monitor 148 can compute these metrics using the metrics output by the components and up to date information about the deployment architecture.

As a particular example, Dopplers are log collection components of a logger that gather and stream logs and metrics from user applications running on the cloud application platform 120. A Doppler can gather logs from agents that are collocated with source logging agents. To determine when to scale the Dopplers, the deployment manager 140 can use an awareness of the load in combination with the current instance count of the Doppler component. For example, the number of Doppler instances may need to be increased when the average rate of messages per Doppler instance exceeds a threshold. Absent the computations by the health monitor 148, a user would have to manually adjust the calculations based on their awareness of the number of Doppler instances deployed. The health monitor 148 can obtain this information, compute the metric, and use the metric to scale the Doppler component regardless of the current count of Doppler instances deployed on the cloud application platform 120.

An example metric computed by the health monitor 148 is a percentage of overall memory available. This metric can indicate the percentage of available memory across multiple cells, e.g., all cells of the cloud application platform 120. In some implementations, this metric indicates the percentage of available memory across all cells averaged over a time period, e.g., the last minute, the last five minutes, or another appropriate time period. This metric can be used to automate and monitor platform scaling. The health monitor 148 can also compute a total memory available metric. This metric indicates the total remaining memory across multiple cells, e.g., all cells, averaged over a given time period such as the last minute, last five minutes, or another appropriate time period. This metric can also be used for automating platform scaling and understanding ongoing trends for capacity planning.

The health monitor 148 can also compute a percentage of overall disk available metric. This metric indicates the percentage of available data storage space, e.g., disk space, across multiple cells, e.g., all cells of the cloud application platform 120 averaged over a given time period such as the last minute, last five minutes, or another appropriate time period. This metric can also be used for automating and monitoring platform scaling.

The health monitor 148 can also compute a total disk capacity available metric. This metric indicates the total remaining available data storage space, e.g., disk space, across multiple cells, e.g., all cells of the cloud application platform 120 averaged over a given time period such as the last minute, last five minutes, or another appropriate time period. This metric can be also used for automating platform scaling and understanding ongoing trends for capacity planning.

The health monitor 148 can also compute a percentage of overall container capacity available metric. This metric indicates the percentage of available cell container capacity, e.g., averaged over a given time period such as the last minute, last five minutes, or another appropriate time period. This metric can be used for automating and monitoring platform scaling.

The health monitor 148 can also compute a total container capacity available metric. This metric indicates the total remaining available cell container capacity, e.g., averaged over a given time period such as the last minute, last five minutes, or another appropriate time period. This metric can be also used for automating platform scaling and understanding ongoing trends for capacity planning.

The health monitor 148 can also compute a log transport loss rate metric. This metric indicates the loss rate per unit time, e.g., per minute, per hour, and/or per another appropriate time period, for data being transmitted by a log aggregation module, e.g., the Loggregator Firehose of a Cloud Foundry platform. This metric can be used to monitor the log aggregation module and/or to automate and monitor platform scaling.

The health monitor 148 can also compute a log transport reverse log proxy loss rate metric. This metric indicates the reverse log proxy loss rate per unit time, e.g., per minute, per hour, and/or another appropriate time period, for a particular component of the data logger. For example, the particular component may be a component that collects logs from log collection modules, e.g., Dopplers, and forwards them to adapters of a log drain module, e.g., Syslog adapters of a CF Syslog Drain component of the Loggregator. This metric can be used to automate and monitor platform scaling and/or to monitor the CF Syslog Drain component of the Loggregator or a log drain module of another type of log aggregation module.

The health monitor 148 can also compute a log transport adapter loss rate metric. This metric indicates the adapter loss rate per unit time, e.g., per minute, per hour, and/or another appropriate time period, for a particular component, e.g., the CF Syslog Drain of the data logger.

The health monitor 148 can also compute a number of available free chunks of memory metric that indicates a number of chunks of available memory. This metric can indicate the number of chunks of available memory across multiple cells, e.g., across all cells of the cloud application platform 120. The size of the chunks can be specified by a user. This metric can be used for automating and monitoring platform scaling. For example, insufficient free chunks of memory can prevent pushing and scaling applications. Thus, monitoring the amount of free chunks remaining is a more valuable indicator of impending "cf push" errors due to lack of memory than relying on metrics related to the amount of memory remaining alone.

The health monitor 148 can also compute a syslog drain binding capacity metric. This metric indicates the number of reported syslog drain bindings divided by the number of Syslog Adapters to product a rolling average, e.g., a five minute rolling average or a rolling average for another appropriate time period. This metric can be used for automating and monitoring platform scaling and/or to monitor the CFSyslog Drain component of the Loggregator or another component of another type of log aggregation module. For example, each adapter may be capable of handling a limited number of bindings. Computing the ratio of drain bindings to available adapters helps to monitor and scale adapter instances.

The health monitor 148 can also compute a log transport message rate capacity metric. This metric indicates the number of reported messages coming in to log collection modules or servers, e.g., Doppler servers of Loggregator, divided by the current number of log collection module instances to produce an approximate messages-per-minute rate load on the log collection module instances. This metric can be used for automating and monitoring the platform scaling of the Doppler component portion of Loggregator or the log collection module of another type of log aggregation module. The metric represents the average load of each Doppler instance. If the average load exceeds a threshold, additional Doppler instances should be added.

The health monitor 148 can also compute a deployment is occurring metric that indicates whether a deployment manager 140 is being deployed. This provides context on other metrics that may be impacted temporarily by deployments occurring.

If purposeful isolation within the cloud application platform 120 occurs, such as the use of isolation segments, the health monitor 148 can create the above metrics per isolation segment. The health monitor 148 does this using automatic discovery of the newly created isolation segments. The health monitor 148 can then select the metrics to create for each segment using product logic that defines which metrics are relevant to each point of isolation.

Figure 2:
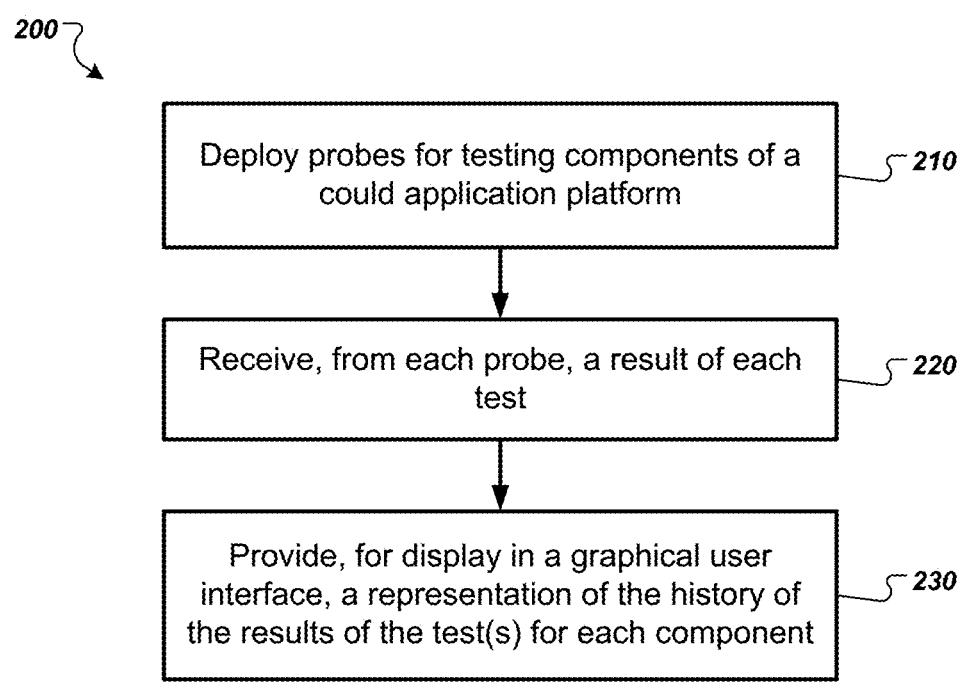
FIG. 2 is a flow chart of an example process for testing a cloud application platform and providing a graphical user interface that includes a representation of the results of the tests.

FIG. 2 is a flow chart of an example process 200 for testing a cloud application platform and providing a GUI that includes a representation of the results of the tests. For convenience, the process 200 will be described as being performed by a system of one or more computers, located in one or more locations, and programmed appropriately in accordance with this specification. For example, the process 200 can be performed by a cloud application platform, e.g., the cloud application platform 120 of FIG. 1.

A health monitoring application, e.g., the health monitor 148 of FIG. 1, of a cloud application platform deploys probes for testing components of a cloud application platform (210). As described above, the cloud application platform can provision resources from an underlying cloud infrastructure system for hosting applications. The cloud infrastructure system can be a cloud computing platform provided by a cloud provider or a local computer network, e.g., on-premises servers.

Each probe can be configured to perform one or more tests that measure performance of one or more components of the cloud application platform and/or the underlying cloud infrastructure system. Each probe can include an application that performs the tests. For example, the health monitoring application can initiate one or more virtual machines and install the probe application(s) on the virtual machine(s). The virtual machine(s) and probe application(s) can be deployed on top of the cloud application platform.

At least one of the probes can attempt to provision resources from the underlying cloud infrastructure system by launching a test application on the cloud application platform. This probe can then determine whether the test application launched successfully using resources from the underlying cloud infrastructure system 152. This probe can also determine the duration of time that the cloud application platform took to launch the test application.

The health monitoring application can also deploy other probes. For example, the health monitoring application can launch a deployment director health application, a CLI command health application, a canary health application, an ops manager health application, and/or other appropriate probes. Each probe can perform one or more tasks that test the cloud application platform and/or the underlying cloud infrastructure system and provide data specifying the results of the tests. The results can include whether or not the cloud application platform and/or the underlying cloud infrastructure system passed the test and/or related metrics that were measure or monitored during the test. For example, these metrics can include a duration of time taken to complete one or more tasks.

A probe can compare the measured performance of a component to a threshold level of performance and provide data specifying whether the measured performance satisfies, e.g., meets or exceeds, the threshold to the health monitoring application. For example, the CLI command health application can determine whether the push time measured for a push test satisfies a threshold push time or at least a threshold number of the measured push times satisfies the threshold push time. The CLI command health application can also provide data specifying whether the push time measured for a push test satisfies a threshold push time to the health monitoring application. In another example, the health monitoring application can make this determination based on push times received from the CLI command health application. Either way, the health monitoring application can generate an alert, e.g., an audible alarm, visible alert on a GUI, or ab electronic message, for a user.

The health monitoring application can receive the result(s) of each of the one or more tests (220). The health monitoring application can provide, for display in a GUI, a representation of a history of the results of the test(s) for at least one of the components of the cloud application platform (230). For example, the health monitoring application can generate one or more GUIs that present the history of the results of the test(s). In this example, the health monitoring application can provide the generated user interface(s) to a user device. In another example, the health monitoring application can provide data specifying the results of the test(s) to a user device. The user device can then generate the user interface(s) using the received data.

FIGS. 3-6 depict example user interfaces that present data related to the health and performance of a cloud application platform, its components, and an underlying cloud infrastructure system. A health monitor, e.g., the health monitor 148 of FIG. 1, can obtain the data presented by the user interfaces and/or generate the user interfaces. For example, the health monitor can obtain the data by deploying probes that perform tasks that test the components of the cloud application platform and collect data related to the results of the tests. The user interfaces unconventional elements and arrangements of elements, such as horizontal sequences of color-coded vertical bars or other visual elements in which each bar in a sequence represents the result of a particular test represented by the sequence. This sequence of color-coded bars makes it easier for users, e.g., platform operators, to quickly identify components of the cloud application platform that is experiencing problems or performance degradations.

Figure 3A:
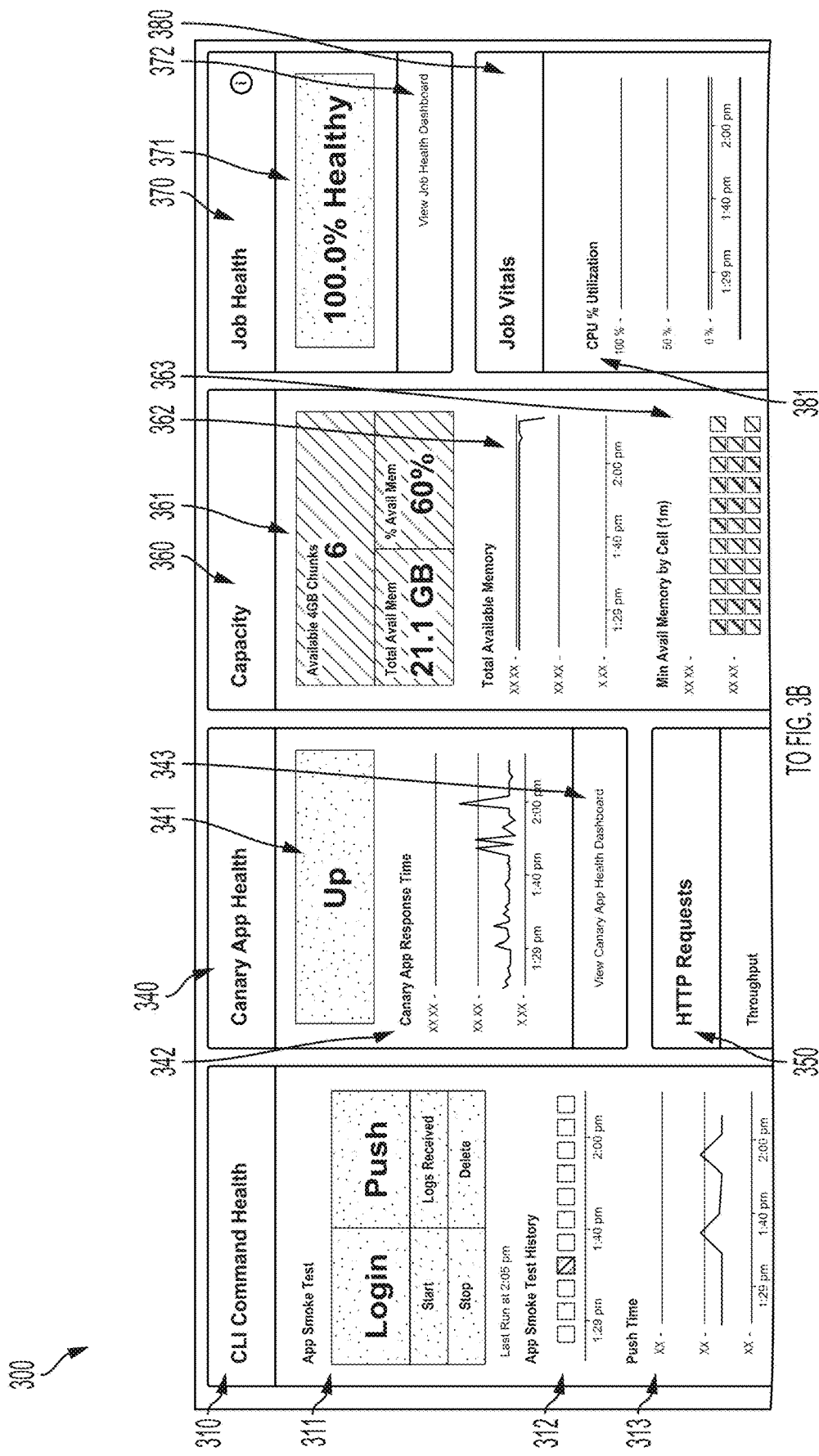
FIGS. 3A-3C depict an example dashboard user interface that presents results of tests performed on components of a cloud application platform.
Figure 3B:
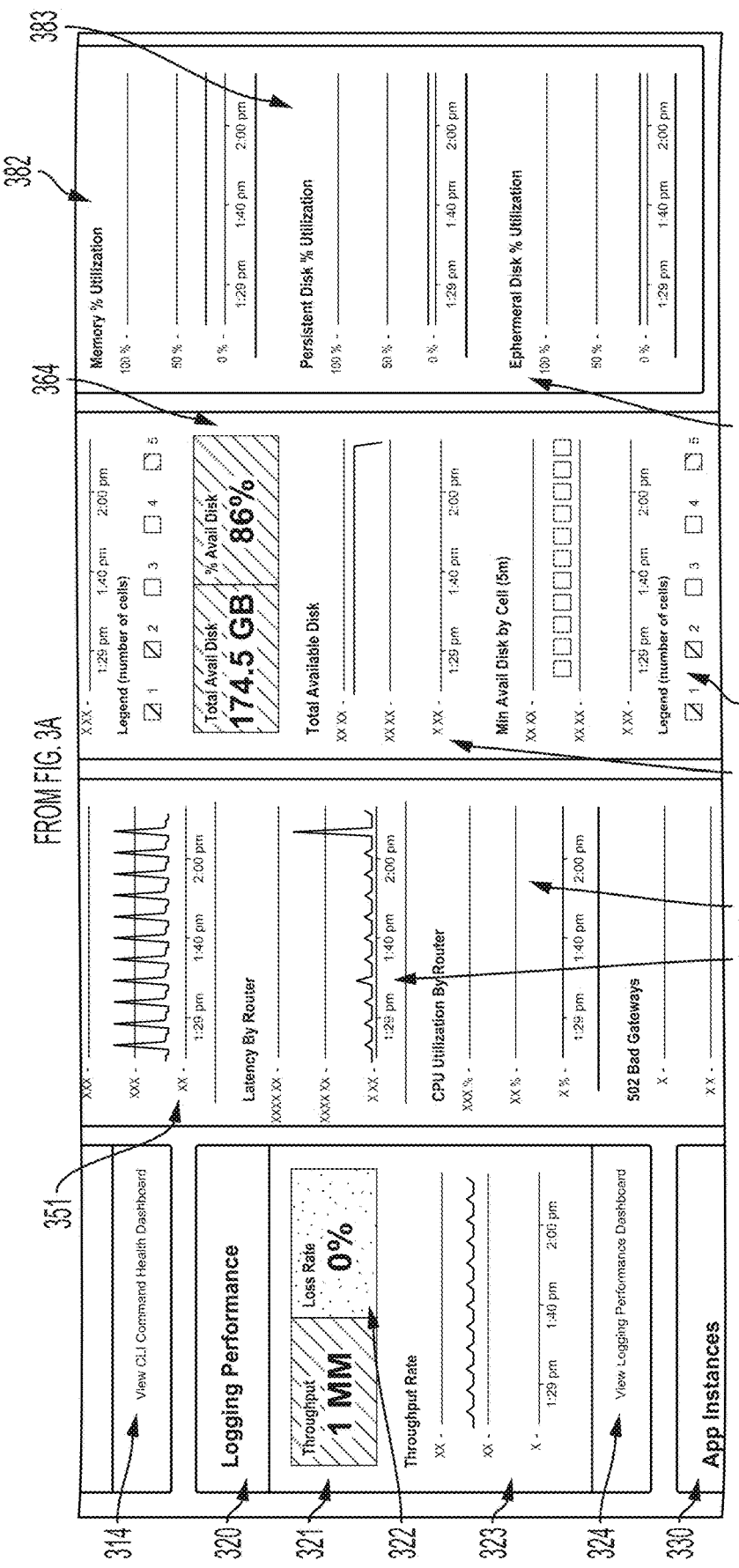
Figure 3C:
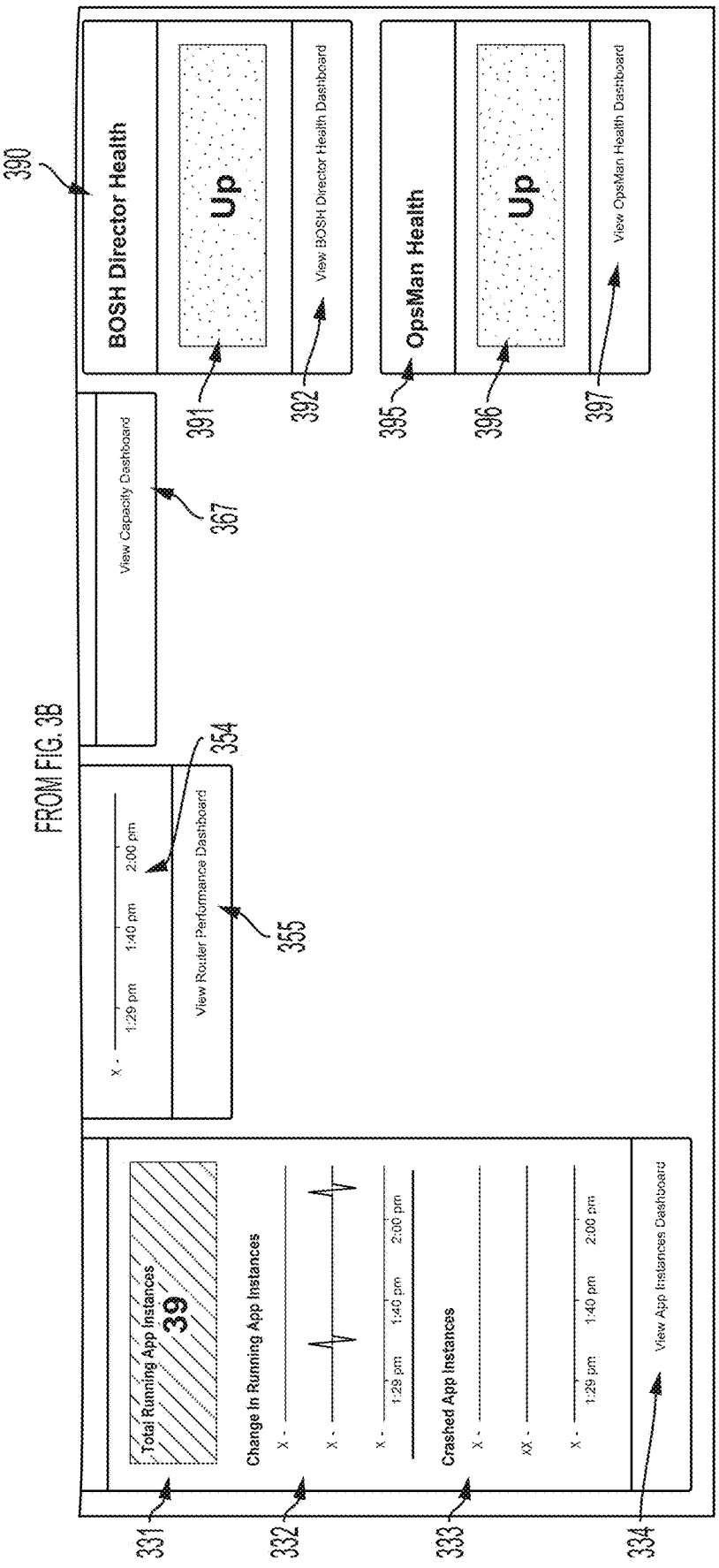

FIGS. 3A-3C, collectively FIG. 3, depict an example dashboard user interface 300 that presents results of tests performed on components of a cloud application platform. The dashboard user interface 300 presents a limited summary of the results of the tests and a limited selection of metrics that enables a user to quickly and efficiently determine the overall health and performance of the cloud application platform without having to navigate to multiple different interfaces. The dashboard user interface 300 also includes links to user interfaces that present additional, e.g., more detailed information, for the various test results.

The dashboard user interface 300 includes a CLI command health interface element 310 that includes the results of tests performed on the CLI of the cloud application platform. For example, the CLI command health interface 300 can include the results of the tests performed by the CLI command health application of a probe, as described above. The CLI command health interface 300 includes a limited set of information that represents the current and recent health and performance of the CLI interface.

The CLI command health interface element 310 includes a smoke test element 311 that indicates whether or not the CLI passed the most recent battery of tests. In this example, the battery of tests include a login test, a push test, a start test, a stop test, a logs received test, and a delete test. The color of the block for each test can represent whether the test was passed. For example, the block that includes the text "Login" can be green or another color if the CLI passed the login test or red or another color different from the passed test color if the CLI failed the login test. This smoke test element 311 allows a user to quickly determine the health of the CLI and whether it was able to perform its core tasks with a simple glance at the element 311.

The CLI command health interface element 310 also includes a CLI smoke test history element 312. The CLI smoke test history element 312 shows a recent history of the results of the CLI tests. Each block of the CLI smoke test history element 312 can indicate whether the CLI passed a particular test performed at a particular time. For example, each block can be depicted in a first color, e.g., green or another color, if the CLI passed the test performed at the time represented by the block and a second color, e.g., red or another color different from the first color, if the CLI failed the test performed at the time represented by the block. The color of each block can represent the overall test result for the CLI based on whether each task, e.g., login, start, stop, etc., was performed successfully and optionally the duration of time taken to perform each task, as described above.

The CLI command health interface element 310 also includes a push time graph 313 that depicts a recent history of push times for the CLI. As described above, the push time is duration of time taken to launch an application in response to receiving a push request from a CLI of a user device.

The CLI command health interface element 310 also includes a link 314 to a CLI command health dashboard interface that presents more detail about the health and performance of the CLI of the cloud application platform. For example, user interaction with the link 314 can cause a user device to present the GUI 400 illustrated in FIG. 4 and described below. The CLI tests for which results and metrics are presented in the CLI command health interface element 310 can be performed for a test application rather than an application deployed by a user.

The dashboard user interface 300 also includes a logging performance interface element 320. The logging performance interface element 320 includes a throughput element 312 that indicates the most recent measured throughput rate of a data logging component or log aggregation module, e.g., the Loggregator Firehose of a Cloud Foundry platform, that transfers data related to applications deployed on the cloud application platform and data to various endpoints.

The logging performance interface element 320 includes a loss rate element 322 that indicates a most recent loss rate for the data logging component. The color of the loss rate element 322 can be based on whether the loss rate meets or exceeds a threshold. For example, the color can be green if the loss rate is less than the threshold, e.g., indicating an acceptable loss rate, or red if the loss rate meets or exceeds the threshold, e.g., indicating an unacceptable loss rate.

The logging performance interface element 320 also includes a throughput rate graph 323 that depicts a recent history of throughput rates for the data logging component. The logging performance interface element 320 also includes a link 324 to a logging performance dashboard interface that presents more detail about the health and performance of the data logging component.

The dashboard user interface 300 also includes an application instances interface element 330. The application instances interface 330 includes a running apps instances element 331 that indicates a current number of application instances running on the cloud application platform. The application instances interface 330 also includes a change in running apps instances graph 332 that depicts the number of instances of applications running on the cloud application platform over a recent time period.

The application instances interface 330 also includes a crashed app instances graph 333 that depicts the number of application instances that have crashed while running on the cloud application platform over a recent time period. The application instances interface 330 also includes a link 334 to an application instances dashboard that presents more detail about applications running on the cloud application platform.

The dashboard user interface 300 also includes a canary application health interface element 340 that includes the results of tests performed on a canary application, e.g., the applications manager 144 of FIG. 1. The canary application health interface element 340 includes a status element 341 that indicates whether the canary application is "up", e.g., responsive, or "down", e.g., unresponsive. The color of the status element 341 can also indicate the status of the canary application. For example, the status element 341 can be green if the canary application is responsive and red if the canary application is not responsive.

The canary application health interface element 340 also includes a canary application response time graph 342 the depicts the response time of the canary application over a recent time period. The canary application health interface element 340 also includes a link 343 to canary application dashboard that presents more detail about the health of the canary application.

The dashboard user interface 300 also includes an HTTP requests interface element 350 that includes data related to the performance of a router of the cloud application platform. The HTTP requests interface element 350 includes a throughput graph 351 that depicts the throughput rate of the HTTP requests over a recent time period. The HTTP requests interface element 350 also includes a CPU utilization by router graph 352 that depicts the utilization of a CPU by a router handling the HTTP requests over a recent time period. The HTTP requests interface element 350 also includes an SQ2 bad gateways graph 354 that indicates a number of bad gateway errors that have occurred over a recent time period. The HTTP requests interface element 350 also includes a link 355 to a router performance dashboard that presents more detail about the health and performance of the router.

The dashboard user interface 300 also includes a capacity user interface element 360 that includes data related to the memory capacity and data storage capacity of the cloud application platform. The capacity user interface element 360 includes a set of elements 361 that indicates the number of available memory chunks, the total amount of available memory, and the percentage of available memory.

The capacity user interface element 360 also includes an available memory graph 362 that depicts the amount of available memory over a recent time period. The capacity user interface element 360 also includes a minimum available memory by cell graph 363 that presents, for each cell, a minimum amount of available memory over a recent time period.

The capacity user interface element 360 also includes blocks 364 that indicates the total available disk space of the cloud application platform that is currently available and the percentage of disk space of the cloud application platform that is currently available. The capacity user interface element 360 also includes a total available disk graph 365 that depicts the total available disk space of the cloud application platform over a recent time period. The capacity user interface element 360 also includes a minimum available disk by cell graph 366 that depicts, for each cell, an amount of available disk space over a recent time period. The capacity user interface element 360 also includes a link 367 to a capacity dashboard that presents more detail about the memory and data storage capacity of the cloud application platform.

The dashboard user interface 300 also includes a job health user interface element 370 that includes data related to the health and performance of a job, e.g., virtual machine, deployed on the cloud application platform. The job health user interface element 370 includes a status element 371 that indicates whether or not the job is healthy. The color of the status element 371 can also indicate the status of the job. For example, the status element 371 can be green if the job is healthy and red if the job is not healthy. The job health user interface element 370 also includes a link 372 to a job health dashboard that presents details about the health of the job.

The dashboard user interface 300 also includes a job vitals user interface element 380 that includes metrics for the job. The job vitals user interface element 380 includes a CPU utilization graph 381 that depicts the utilization of a CPU of the job over a recent time period. The job vitals user interface element 380 includes a memory utilization graph 382 that depicts the utilization of memory allocated to the job over a recent time period. The job vitals user interface element 380 includes a percentage disk utilization graph 383 that depicts the utilization of disk space allocated to the job over a recent time period. The job vitals user interface element 380 includes an ephemeral disk utilization graph 384 that depicts the utilization of ephemeral disk space allocated to the job over a recent time period.

The dashboard user interface 300 also includes a deployment director health user interface element 390 that includes data related to the health of the deployment manager, e.g., a BOSH director, of the cloud application platform. The deployment director health user interface element 390 includes a status element 391 that indicates whether the deployment director is "up", e.g., running, or "down", e.g., not running. The color of the status element 391 can also indicate the status of the deployment director. For example, the status element 391 can be green if the deployment director is running and red if the deployment director is not running. The deployment director health user interface element 390 also includes a link 392 to a deployment director health dashboard that presents details about the health of the deployment director.

The dashboard user interface 300 also includes an operations manager health user interface element 395 that includes data related to the health of the operations manager of the cloud application platform. The operations manager health user interface element 395 includes a status element 396 that indicates whether the operations manager is "up", e.g., running, or "down", e.g., not running. The color of the status element 396 can also indicate the status of the operations manager. For example, the status element 396 can be green if the operations manager is running and red if the operations manager is not running. The operations manager health user interface element 395 also includes a link 397 to an operations manager health dashboard that presents details about the health of the operations manager.

In FIG. 3, some elements depict a particular color, e.g., green, when the component of the cloud application platform is healthy and a different color, e.g., red, when the component is not healthy. Other colors can be used to represent other statuses, e.g., yellow for an in-between healthy and unhealthy state or a state trending towards unhealthy. By using the same color scheme for each component of the cloud application platform, a user can quickly scan the dashboard interface 300 and identify any unhealthy components and select its link to obtain more information about the unhealthy component.

Figure 4A:
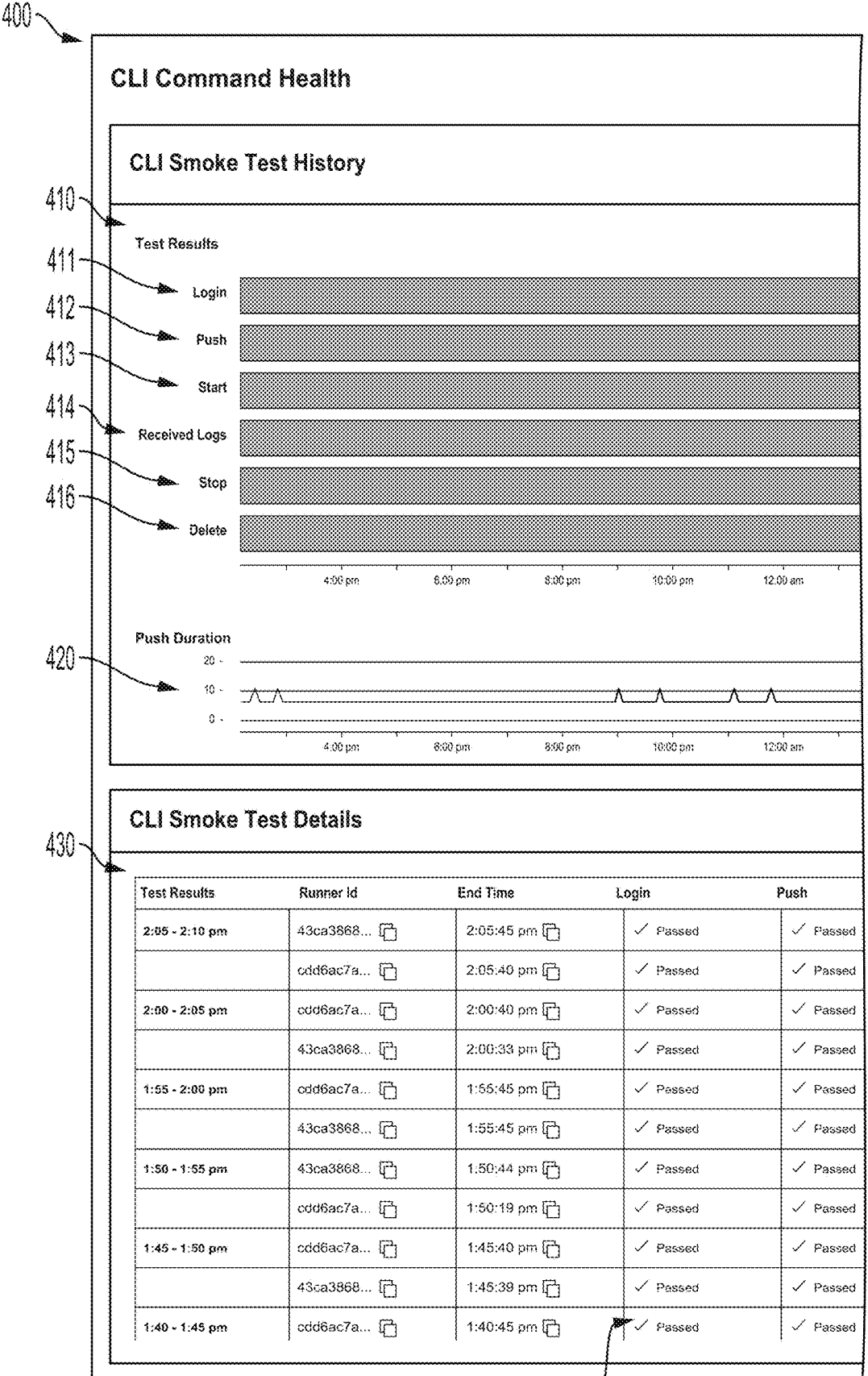
FIGS. 4A and 4B depict an example graphical user interface that presents historical results of tests performed on a command line interface (CLI) component of a cloud application platform.
Figure 4B:
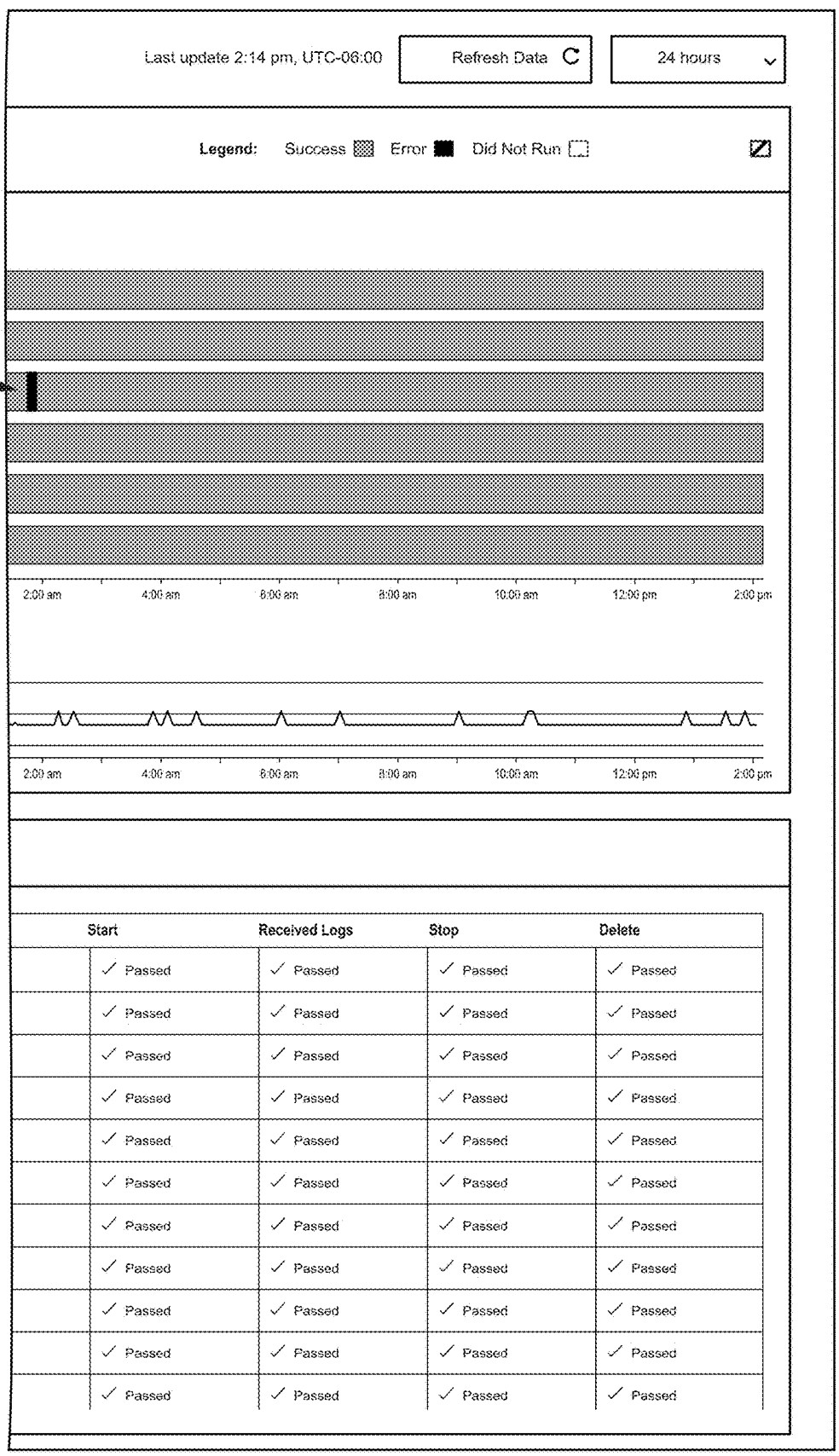

FIGS. 4A and 4B, collectively FIG. 4, depict an example GUI 400 that presents historical results of tests performed on a CLI component of a cloud application platform. The interface 400 includes a historical test results graph 410 that includes, for each test performed on the CLI, a sequence of vertical bars, e.g., or lines, or other visual indicators, for each time at which the test was performed on the CLI. Each bar can be depicted in a color based on the result of the test for the time represented by the bar. For example, the color of the bar can be green of the CLI passed the test, red if the CLI failed the test, or black if the test was not performed. In the illustrated example, a grey bar represents a passed test and a black bar represents a failed test. Of course, other colors could be used to represent each result.

The bars can be placed side by side such that adjacent bars touch. In this way, a sequence of bars representing the same result, e.g., pass or fail, looks like a constant block. In other examples, there may be spaces between adjacent bars. In some implementations, the various results of the test can be represented by different patterns or hatchings, different shades of the same color, or using other varying visual characteristics.

In this example, the historical test results graph 410 includes a first sequence of vertical bars 411 that represent the results of a login test, a second sequence of vertical bars 412 that represent the results of a push application test, a third sequence of bars 413 that represent the results of a start application test, a fourth sequence of bars 414 that represent the results of a received logs test, a fifth sequence of bars 415 that represent the results of a stop application test, and a sixth sequence of bars 416 that represent the results of a delete application test. In this example, the CLI passed each test each time except that the start application test was failed once, as indicated by the black bar 419. The single black bar 419 is easily noticed at first glance at the interface 400, making it easier for a user to quickly see any failed tests, what test(s) were failed, and when the test(s) were failed.

Due to the difference in color between the results of the tests and the sequences of bars being displayed adjacent to each other and synchronized for the times at which the tests were performed, a user can quickly determine when test(s) were failed and determine whether the failed tests were likely related. For example, if two tests were failed at about the same time, the graph 410 would show a red bar for each test near the same time within the graph 410. The graph 410 also enables a user to identify the time at which tests were failed to help in diagnosing a problem with the cloud application platform at that time. The graph 410 also allows a user to determine that the cloud application platform is trending towards an unhealthy or degraded state based on the number of red bars that start to occur in the graph 410.

The GUI 400 also includes a push duration graph 412 that depicts the push durations over the same time period as the graph 410. A user can use this graph to determine if push times are increasing or spiked at certain times, which can indicate that the CLI is having issues or is unhealthy.

The GUI 400 also includes a test details table 430 that shows the test results for each test performed at several recent times. For example, the test includes a row for each of multiple time periods in which tests were performed and a column for each test. The cell for a particular time period and a particular test indicates the result of that test for that time period. For example, the cell 431 indicates that the CLI passed the login test that was performed between 1:40 and 1:45 PM.

Figure 5A:
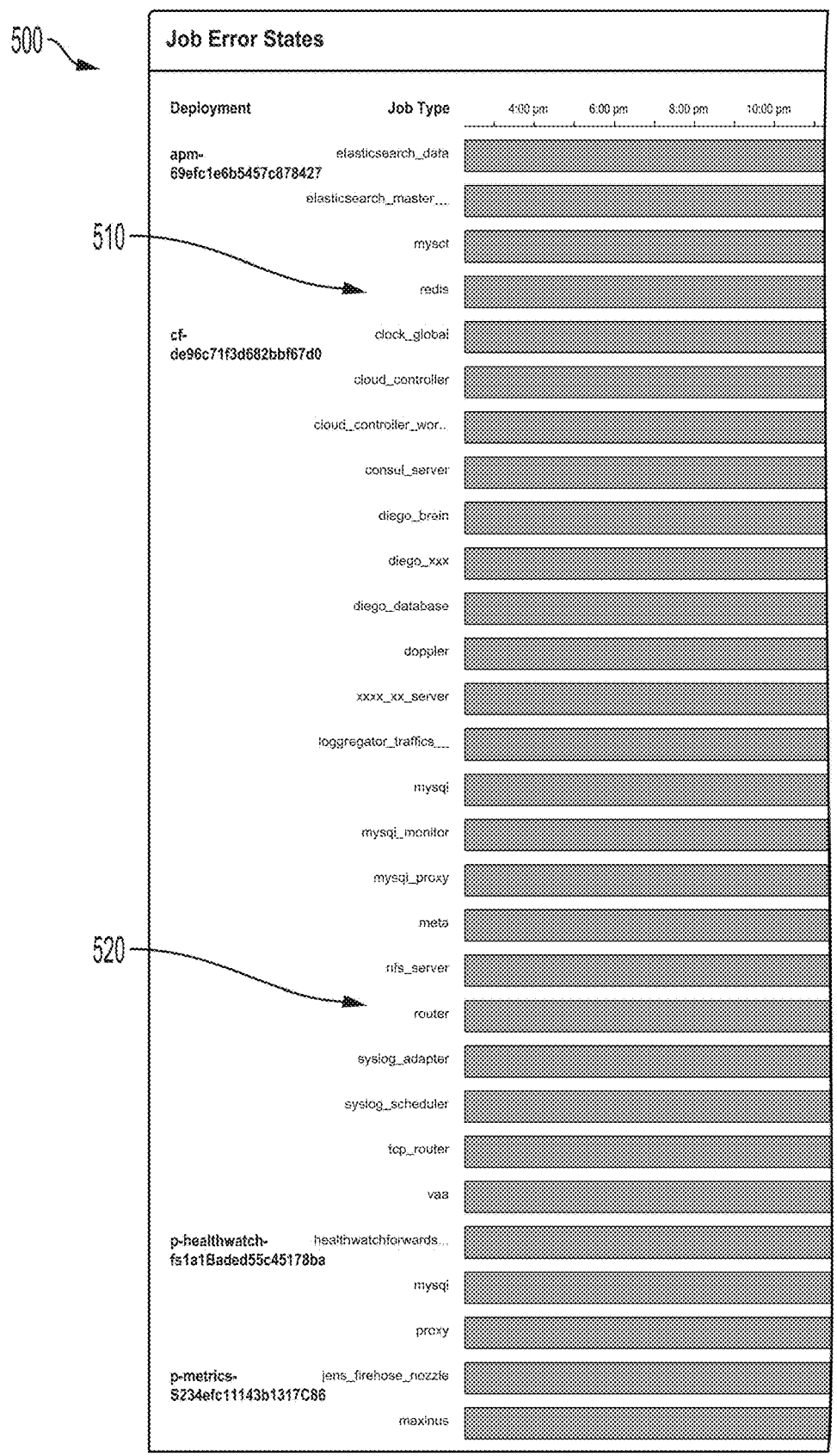
FIGS. 5A and 5B depict an example graphical user interface that presents historical status of jobs deployed on a cloud application platform.
Figure 5B:
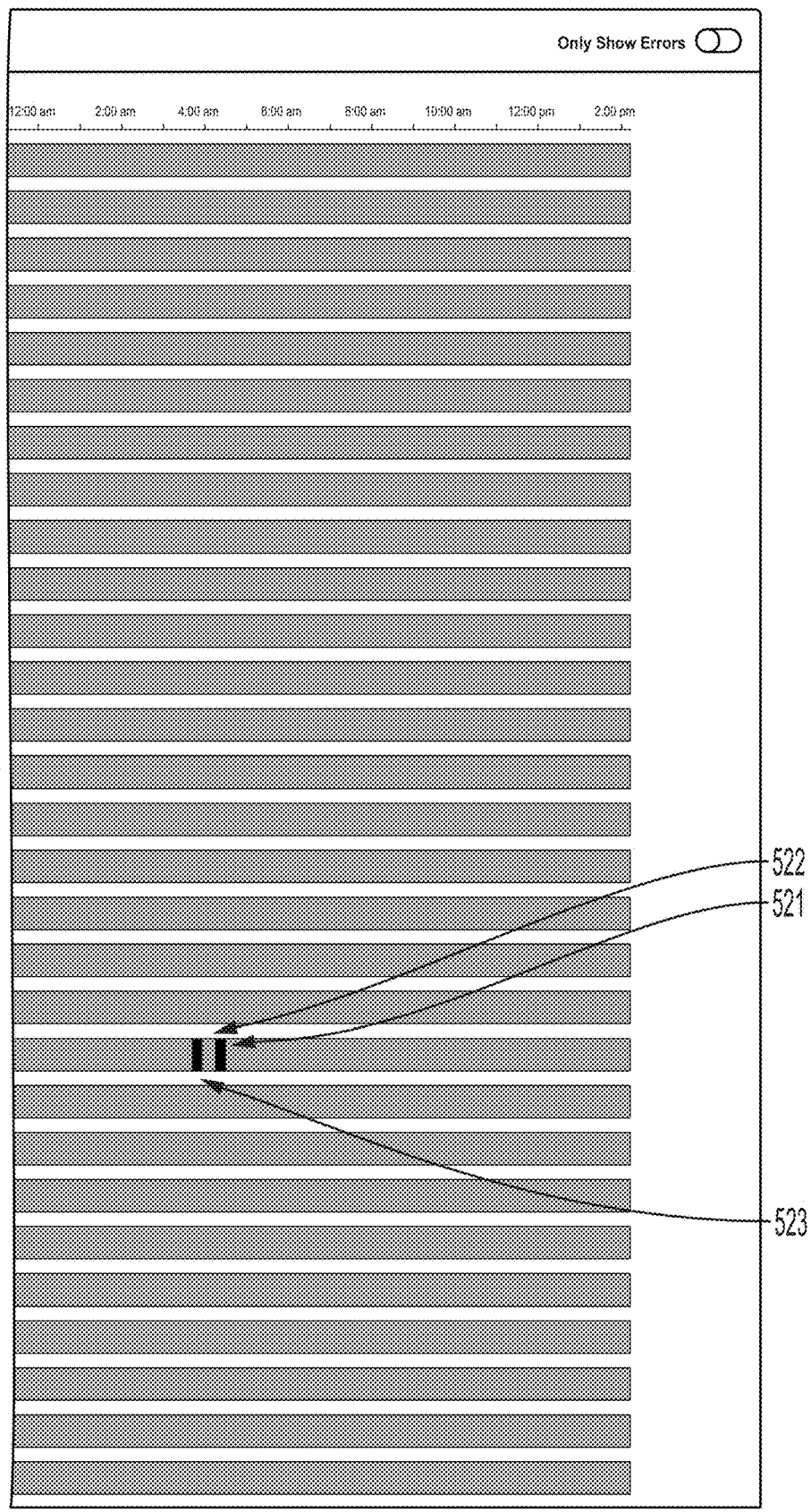

FIGS. 5A and 5B, collectively FIG. 5, depict an example GUI 500 that presents historical status of jobs deployed on a cloud application platform. The interface 500 may be presented in response to user interaction with the link 372 of FIG. 3. The jobs can include jobs that support the operation of the cloud application platform.

The interface 500 includes a graph 510 with sequences of bars for each job. Each bar represents the state of the job at a given point in time. In this example, a grey bar represents a healthy state and a black bar represents an error state. Of course, other colors, such as green for healthy and red for error state can be used.

The sequence of bars 520 for the router job includes two black bars 521 and 523 that indicate that the router job was in an error state twice in the time period for which data is being presented in the graph 510. Between the two black bars is a grey bar 522 that indicates that the router job was healthy during the time between the two times at which the router job was in an error state. The up and down state of the router job during this time period can be easily detected with just a quick glance at the interface 500.

Figure 6A:
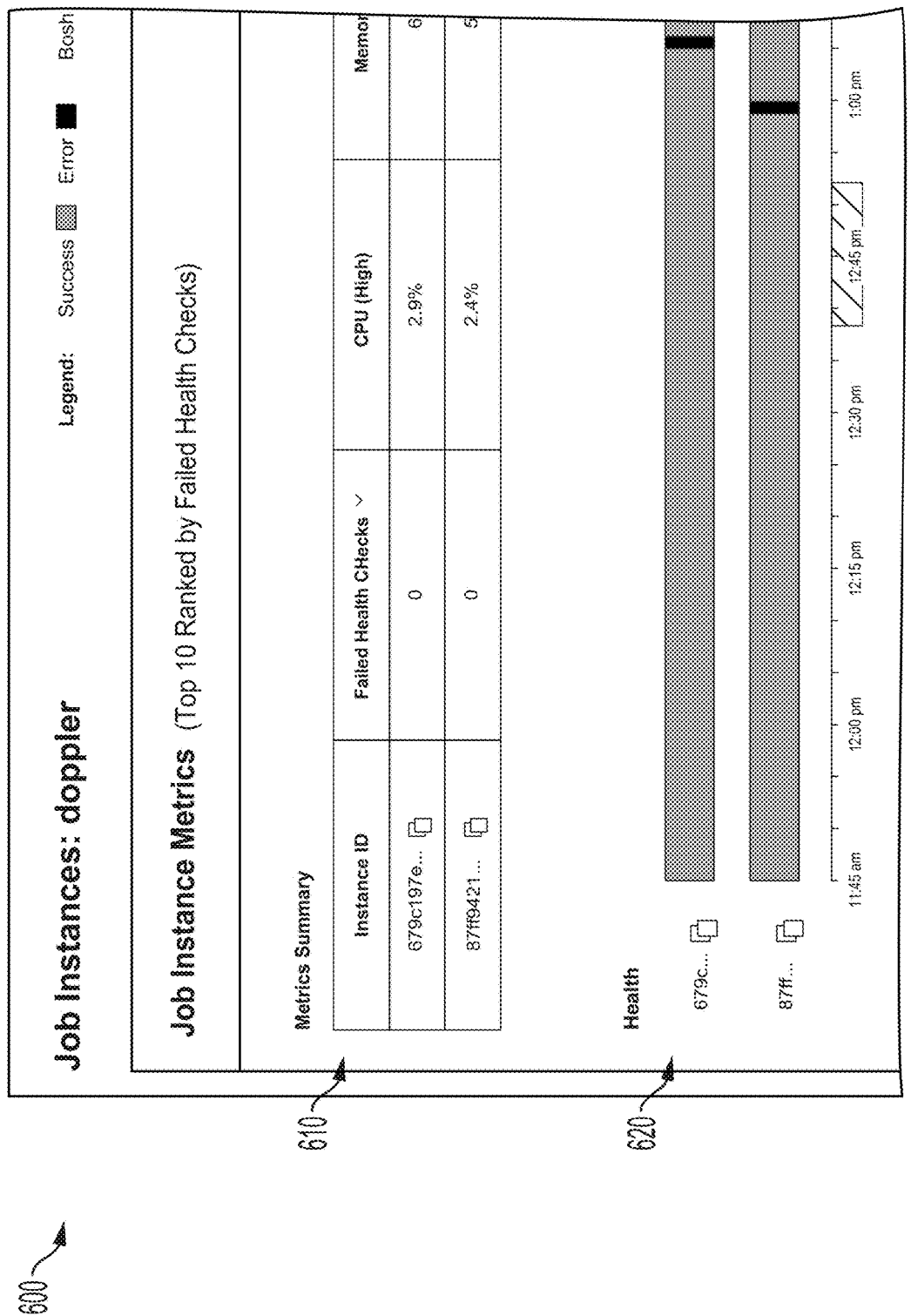
Figure 6B:
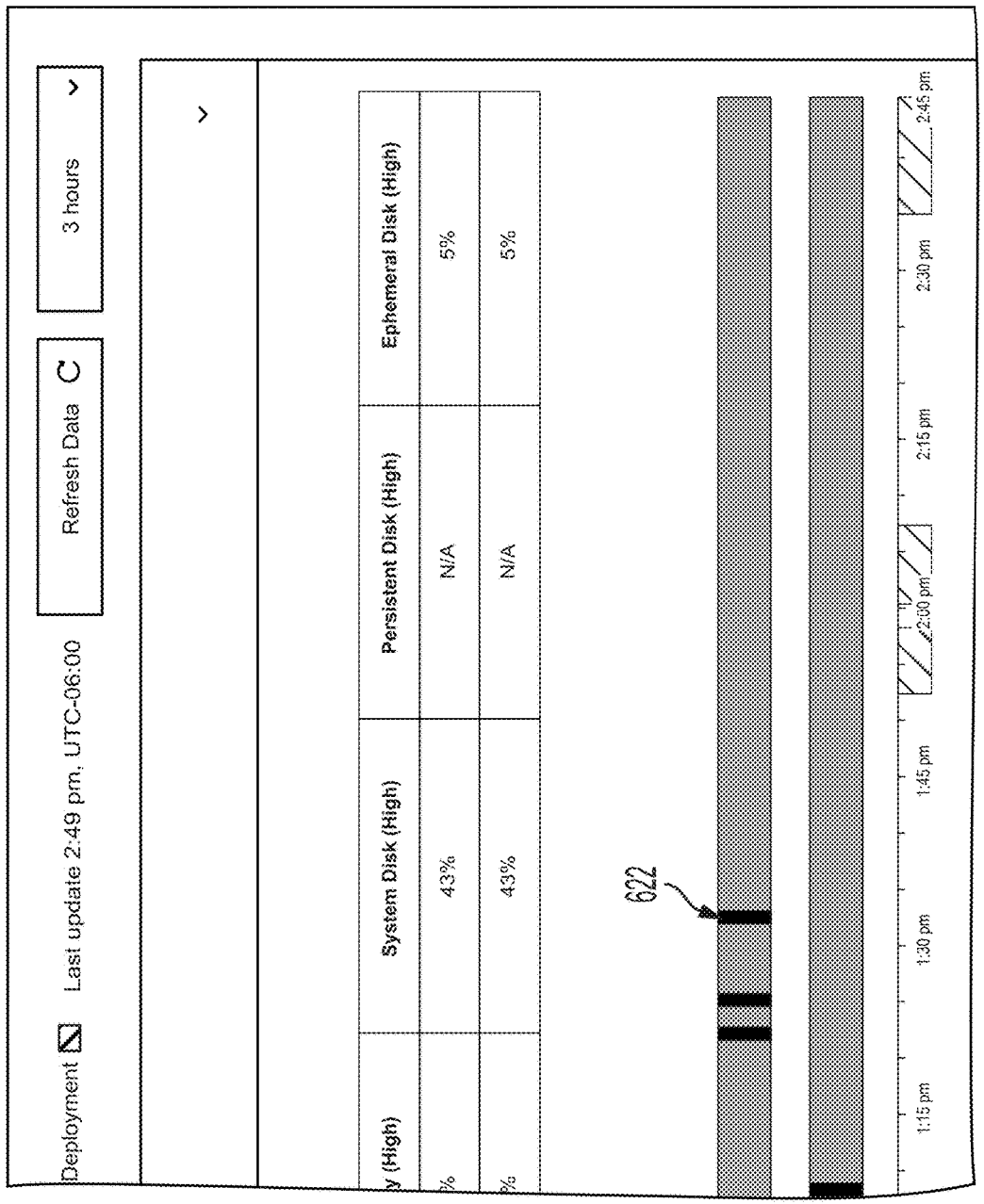

FIGS. 6A-6D, collectively FIG. 6, depict an example GUI 600 that presents metrics for jobs deployed on a cloud application platform. The interface 600 presents a detailed summary of information related to the jobs.

The interface 600 includes a metrics summary table 610 that includes metrics for one or more jobs. In this example, the table 610 includes metrics for two jobs. The table 610 includes, for each job, a number of failed health tests over a recent time period, a high, e.g., maximum recorded, amount of CPU utilization over the time period, a high amount of memory utilization over the time period, a high amount of system disk usage over the given time period, a high amount of persistent disk usage over the time period, and a high amount of ephemeral disk usage over the time period.

The interface 600 also includes a graph 620 that shows the status of the jobs over the time period, similar to the graph 510 of FIG. 5. The interface 600 also includes a graph 630 that depicts the CPU utilization of the jobs over the time period, a graph 640 that depicts the memory utilization of the jobs over the time period, a graph 650 that depicts the system disk utilization of the jobs over the time period, an a graph 660 that depicts the ephemeral disk utilization over the time period.

Interfaces similar to the interface 600 can be used to present metrics for the performance and health data for other components, such as the CLI, deployment director, operations manager, and canary application. For example, the other detailed interfaces can include similar graphs with health and performance data related to the components so that the interfaces have a consistent look and feel to make it easier for users to find the information they need.

The interfaces illustrated in FIGS. 3-6 can be visually updated continuously, e.g., in real time, or periodically. For example, each interface can be updated each time a metric is measured or determined and/or each time a test is performed. In this example, the vertical sequences of bars can be updated to include a new bar for the most recent test and an old bar can be removed from the interface, e.g., the oldest bar that was displayed on the interface prior to the most recent test being performed can be removed. In this way, the interfaces present the most recent data that represents the most recent health and performance of the cloud application platform and/or the underlying cloud infrastructure system. This also allows users, e.g., platform operators, to monitor the results of the tests in real time to detect problems prior to the problems escalating.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
deploying, by a health monitoring application of a cloud application platform that provisions resources from an underlying cloud infrastructure system, a plurality of probes for testing components of the cloud application platform, each probe being configured to perform one or more tests that measure performance of a component of the cloud application platform, wherein:
at least one probe attempts to provision resources from the underlying cloud infrastructure system by launching a test application on the cloud application platform and determining whether the test application launched successfully using resources from the underlying cloud infrastructure system;
receiving, by the health monitoring application and from each of the probes, a result of each of the one or more tests; and
providing, by the health monitoring application for display in a graphical user interface, a representation of a history of the results of the one or more tests for at least one of the components.

Embodiment 2 is the method of embodiment 1, wherein:
a particular probe deploys an application on the underlying cloud infrastructure; and
the application performs one or more tasks using a particular component of the cloud application platform and measures a performance of the particular component of the cloud application platform.

Embodiment 3 is the method of embodiment 2, wherein the application is configured to:
determine whether the measured performance of the component of the cloud application platform satisfies a threshold level of performance; and
send, to the health monitoring application, data specifying whether the measured performance of the component satisfies the threshold level of performance.

Embodiment 4 is the method of embodiment 1, wherein a particular probe:
causes a command line interface to submit a request to a component of the cloud application platform to deploy a test application on the cloud application platform using resources of the underlying cloud infrastructure system; and determines a push time that represents a duration of time between submitting the request and the test application being launched.

Embodiment 5 is the method of embodiment 4, wherein the particular probe:
  compares the push time to one or more previous push times determined by the particular probe;
  determines, based on comparing the push time to the one or more previous push times, that push times for the cloud application platform are increasing; and
  generates an alert in response to determining that the push times for the cloud application platform are increasing.

Embodiment 6 is the method of embodiment 1, wherein a particular probe:
  for each of multiples tests:
    causes a command line interface to submit a request to a component of the cloud application platform to deploy a test application on the cloud application platform using resources of the underlying cloud infrastructure system; and
    determining whether the request failed; and
  determines that the request has failed at least a threshold number of times within a given time period.

Embodiment 7 is the method of embodiment 1, wherein the graphical user interface presents multiple application manipulations for a test application that performs tests on components of the cloud application platform, the test application being deployed by the health monitoring application rather than by a user of the cloud application platform.

Embodiment 8 is the method of embodiment 1, further comprising selecting the probe for each component based on at least one of (i) a type of the component or (ii) a version of the component.

Embodiment 9 is the method of embodiment 1, wherein at least one probe is programmed to perform a task and measure an amount of resources of the underlying cloud infrastructure system allocated for the task and a duration of time for the task to complete.

Embodiment 10 is the method of embodiment 1, further comprising:
  testing the components of the cloud application platform by the health monitoring application, including deploying a respective application on each component of the cloud computing platform and measuring a respective duration of deploying each application; and
  providing a history of results of the testing in the graphical user interface.

Embodiment 11 is the method of embodiment 1, wherein the probes are submitted though a command line interface, and the probes are configured to measure responses of the components of performing functions called from the command line interface.

Embodiment 12 is the method of embodiment 1, wherein:
  the representation of the history of the result of the one or more tests for at least one component of the cloud application platform includes a horizontal sequence of vertical bars with a respective vertical bar for each time at which the one or more tests were performed; and
  each vertical bar is visually represented in a particular color that represents the result of the one or more tests for the time represented by the vertical bar.

Embodiment 13 is the method of embodiment 12, wherein each sequence of vertical bars represents tests performed on a job deployed on the cloud application platform.

Embodiment 14 is the method of embodiment 1, wherein the graphical user interface includes:
  for each of multiple tests, a respective horizontal graph with a respective vertical bar for each time at which the test was performed, wherein each vertical bar is visually depicted in a particular color that represents the result of the test for the time represented by the vertical bar; and
  a table that presents, for each time at which each test was performed, data specifying whether the components of the cloud application platform passed or failed the test.

Embodiment 15 is the method of embodiment 1, wherein the graphical user interface includes, for each of multiple jobs being performed using resources of the underlying cloud infrastructure system, a respective horizontal graph with a respective vertical bar for each time at which a status of the job was evaluated, wherein each vertical bar is visually depicted in a particular color that represents the result of the evaluation for the time represented by the vertical bar.

Embodiment 16 is a system comprising: a plurality of computers and one or more storage devices storing instructions that are operable, when executed by the one or more computers, to cause the one or more computers to perform the method of any one of embodiments 1-15.

Embodiment 17 is a computer storage medium encoded with a computer program, the program comprising instructions that are operable, when executed by a plurality of computers, to cause the plurality of computers to perform the method of any one of embodiments 1-15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers to perform operations comprising:
deploying, by a health monitoring application of a cloud application platform that provisions resources from an underlying cloud infrastructure system for use by applications running on the cloud application platform, a set of test probes for testing components, of the cloud application platform, that deploy applications in a deployment environment and provision resources of the underlying cloud infrastructure for hosting the applications, wherein a plurality of the test probes are applications that each perform a respective set of one or more tests that (i) cause a respective component of the cloud application platform to perform one or more tasks related to deploying an application or provisioning resources for the application and (ii) measure performance of the respective component of the cloud application platform when performing the one or more tasks, wherein:
at least one test probe attempts to provision resources from the underlying cloud infrastructure system by launching a test application in a deployment environment of the cloud application platform and determining whether the test application launched successfully using resources from the underlying cloud infrastructure system;
each test probe is deployed into the deployment environment; and
each test probe tests a different component of the cloud application platform than each other test probe;
receiving, by the health monitoring application and from each of the test probes in the set of test probes, a result of each of the one or more tests; and
providing, by the health monitoring application for display in a graphical user interface, a representation of a history of the results of the one or more tests for at least one of the components.

2. The system of claim 1, wherein:
a particular test probe deploys a particular application on the underlying cloud infrastructure; and
the particular application performs one or more tasks using a particular component of the cloud application platform and measures a performance of the particular component of the cloud application platform.

3. The system of claim 2, wherein the particular application is configured to:
determine whether the measured performance of the component of the cloud application platform satisfies a threshold level of performance; and
send, to the health monitoring application, data specifying whether the measured performance of the component satisfies the threshold level of performance.

4. The system of claim 1, wherein a particular test probe:
causes a command line interface to submit a request to a component of the cloud application platform to deploy a test application on the cloud application platform using resources of the underlying cloud infrastructure system; and
determines a push time that represents a duration of time between submitting the request and the test application being launched.

5. The system of claim 4, wherein the particular probe:
compares the push time to one or more previous push times determined by the particular test probe;
determines, based on comparing the push time to the one or more previous push times, that push times for the cloud application platform are increasing; and
generates an alert in response to determining that the push times for the cloud application platform are increasing.

6. The system of claim 1, wherein a particular test probe:
for each of multiples tests:
causes a command line interface to submit a request to a component of the cloud application platform to deploy a test application on the cloud application platform using resources of the underlying cloud infrastructure system; and
determines whether the request failed; and
determines that the request has failed at least a threshold number of times within a given time period.

7. The system of claim 1, wherein the graphical user interface presents multiple application manipulations for a test application that performs tests on components of the cloud application platform, the test application being deployed by the health monitoring application rather than by a user of the cloud application platform.

8. The system of claim 1, wherein the operations comprise selecting the test probe for each component based on at least one of (i) a type of the component or (ii) a version of the component.

9. The system of claim 1, wherein at least one test probe is programmed to perform a task and measure an amount of resources of the underlying cloud infrastructure system allocated for the task and a duration of time for the task to complete.

10. The system of claim 1, wherein the operations comprise:
testing the components of the cloud application platform by the health monitoring application, including deploying a respective application on each component of the cloud computing platform and measuring a respective duration of deploying each application; and
providing a history of results of the testing in the graphical user interface.

11. The system of claim 1, wherein the set of test probes is submitted though a command line interface, and the test probes in the set of test probes are configured to measure responses of the components of performing functions called from the command line interface.

12. The system of claim 1, wherein:
the representation of the history of the result of the one or more tests for at least one component of the cloud application platform includes a horizontal sequence of vertical bars with a respective vertical bar for each time at which the one or more tests were performed; and
each vertical bar is visually represented in a particular color that represents the result of the one or more tests for the time represented by the vertical bar.

13. The system of claim 12, wherein each sequence of vertical bars represents tests performed on a job deployed on the cloud application platform.

14. The system of claim 1, wherein the graphical user interface includes:
for each of multiple tests, a respective horizontal graph with a respective vertical bar for each time at which the test was performed, wherein each vertical bar is visually depicted in a particular color that represents the result of the test for the time represented by the vertical bar; and a table that presents, for each time at which each test was performed, data specifying whether the components of the cloud application platform passed or failed the test.

15. The system of claim 1, wherein the graphical user interface includes, for each of multiple jobs being performed using resources of the underlying cloud infrastructure system, a respective horizontal graph with a respective vertical bar for each time at which a status of the job was evaluated, wherein each vertical bar is visually depicted in a particular color that represents the result of the evaluation for the time represented by the vertical bar.

16. A method performed by a distributed computing system comprising a plurality of computers, the method comprising:

deploying, by a health monitoring application of a cloud application platform that provisions resources from an underlying cloud infrastructure system for use by applications running on the cloud application platform, a set of test probes for testing components, of the cloud application platform, that deploy applications in a deployment environment and provision resources of the underlying cloud infrastructure for hosting the applications, wherein a plurality of the test probes are applications that each perform a respective set of one or more tests that (i) cause a respective component of the cloud application platform to perform one or more tasks related to deploying an application or provisioning resources for the application and (ii) measure performance of the respective component of the cloud application platform when performing the one or more tasks, wherein:

at least one test probe attempts to provision resources from the underlying cloud infrastructure system by launching a test application in a deployment environment of the cloud application platform and determining whether the test application launched successfully using resources from the underlying cloud infrastructure system;

each test probe is deployed into the deployment environment; and each test probe tests a different component of the cloud application platform than each other test probe;

receiving, by the health monitoring application and from each of the test probes in the set of test probes, a result of each of the one or more tests; and providing, by the health monitoring application for display in a graphical user interface, a representation of a history of the results of the one or more tests for at least one of the components.

17. The method of claim 16, wherein:

a particular test probe deploys a particular application on the underlying cloud infrastructure; and the particular application performs one or more tasks using a particular component of the cloud application platform and measures a performance of the particular component of the cloud application platform.

18. The method of claim 17, wherein the particular application is configured to:

determine whether the measured performance of the component of the cloud application platform satisfies a threshold level of performance; and send, to the health monitoring application, data specifying whether the measured performance of the component satisfies the threshold level of performance.

19. The method of claim 16, wherein a particular test probe:

causes a command line interface to submit a request to a component of the cloud application platform to deploy a test application on the cloud application platform using resources of the underlying cloud infrastructure system; and determines a push time that represents a duration of time between submitting the request and the test application being launched.

20. One or more non-transitory computer storage media encoded with computer program instructions that when executed by a distributed system comprising a plurality of computers cause the plurality of computers to perform operations comprising:

deploying, by a health monitoring application of a cloud application platform that provisions resources from an underlying cloud infrastructure system for use by applications running on the cloud application platform, a set of test probes for testing components, of the cloud application platform, that deploy applications in a deployment environment and provision resources of the underlying cloud infrastructure for hosting the applications, wherein a plurality of the test probes are applications that each perform a respective set of one or more tests that (i) cause a respective component of the cloud application platform to perform one or more tasks related to deploying an application or provisioning resources for the application and (ii) measure performance of the respective component of the cloud application platform when performing the one or more tasks, wherein:

at least one test probe attempts to provision resources from the underlying cloud infrastructure system by launching a test application in a deployment environment of the cloud application platform and determining whether the test application launched successfully using resources from the underlying cloud infrastructure system;

each test probe is deployed into the deployment environment; and each test probe tests a different component of the cloud application platform than each other test probe;

receiving, by the health monitoring application and from each of the test probes in the set of test probes, a result of each of the one or more tests; and providing, by the health monitoring application for display in a graphical user interface, a representation of a history of the results of the one or more tests for at least one of the components.

* * * * *